United States Patent [19]
Hirata et al.

[11] Patent Number: 6,024,276
[45] Date of Patent: Feb. 15, 2000

[54] METHOD FOR BONDING DUAL-PHASE STAINLESS STEEL

[75] Inventors: Hiroyuki Hirata, Neyagawa; Yuuichi Komizo, Nishinomiya; Yasuto Fukada, Hachioji; Masakatsu Ueda, Shiki-gun, all of Japan

[73] Assignee: Sumitomo Metal Industries, Ltd., Osaka, Japan

[21] Appl. No.: 09/118,065

[22] Filed: Jul. 17, 1998

Related U.S. Application Data

[63] Continuation of application No. PCT/JP97/04220, Nov. 19, 1997.

[30] Foreign Application Priority Data

Nov. 19, 1996 [JP] Japan ................................. 8-307577

[51] Int. Cl.⁷ ......................... B23K 20/00; B23K 20/22; B23K 20/24
[52] U.S. Cl. ......................... 228/194; 228/203; 228/231; 228/232; 228/262.41; 148/534; 285/288.1
[58] Field of Search ..................... 228/194, 231, 228/232, 203, 233.2, 262.41; 148/534; 285/288.1

[56] References Cited

U.S. PATENT DOCUMENTS

5,683,822  11/1997  Hasegawa et al. .................... 428/606

FOREIGN PATENT DOCUMENTS

| 62-40980 | 2/1987 | Japan . |
| 62-97784 | 5/1987 | Japan . |
| 63-119993 | 5/1988 | Japan . |
| 63-215388 | 9/1988 | Japan . |
| 3-86367 | 4/1991 | Japan . |
| 6-7967 | 1/1994 | Japan . |
| 8-311563 | 11/1996 | Japan . |

*Primary Examiner*—Samuel M. Heinrich
*Attorney, Agent, or Firm*—Armstrong, Westerman, Hattori, McLeland & Naughton

[57] ABSTRACT

The method provides a diffusion-bonding of dual-phase stainless steel material having excellent strength and corrosion. The method includes: cold-working a material to be bonded so as to enhance the proof stress; inserting into the bonding portion an insert material; applying pressure thereto while performing shielding by mixed nitrogen/argon gas; heating the restricted bonding portion; cooling at a restricted rate; so as to form a bonded portion having the ferritic phase percentage of 30–70% by volume.

20 Claims, 5 Drawing Sheets

| Category | Test No. | Insert material | | Steel pipe No. | Heating temperature (°C) | Holding time (sec.) | Applied pressure (kgf/mm²) | Zone heated to 800°C or higher (mm) | Zone heated to 600°C or higher (mm) | Ar volume content of atmosphere (%) | Cooling rate (°C/s) |
|---|---|---|---|---|---|---|---|---|---|---|---|
| | | No. | Thickness (μm) | | | | | | | | |
| Example of the present invention | A1 | I-1 | 30 | P1 | 1200 | 300 | 1(<1>) | 17 | 34 | 0 | 120 |
| | A2 | I-1 | 30 | P2 | 1200 | 300 | 1(<1>) | 17 | 35 | 0 | 120 |
| | A3 | I-1 | 30 | P3 | 1200 | 300 | 1(<1>) | 16 | 35 | 0 | 120 |
| | A4 | I-1 | 30 | P4 | 1200 | 300 | 1(<2>) | 15 | 31 | 20 | 150 |
| | A5 | I-2 | 30 | P5 | 1200 | 300 | 1(<2>) | 18 | 36 | 50 | 100 |
| | A6 | I-2 | 30 | P6 | 1200 | 300 | 1(<1>) | 19 | 38 | 80 | 50 |
| Example of the Comparison | B1 | I-1 | 30 | *P7 | 1200 | 300 | 1(<1>) | 18 | 35 | 0 | 120 |
| | B2 | I-1 | 30 | *P8 | 1200 | 300 | 1(<1>) | 16 | 35 | 0 | 120 |
| | B3 | I-1 | 120* | P9 | 1200 | 300 | 1(<1>) | 18 | 38 | 20 | 75 |
| | B4 | I-1 | 30 | P10 | 1200 | 300 | 1(<1>) | 28* | 56* | 50 | 100 |
| | B5 | I-1 | 30 | P11 | 1200 | 300 | 1(<1>) | 16 | 48* | 0 | 150 |
| | B6 | I-1 | 30 | *P12 | 1200 | 300 | 1(<1>) | 17 | 36 | 0 | 120 |
| | B7 | I-1 | 30 | P13 | 1200 | 300 | 1(<1>) | 17 | 35 | 90* | 120 |
| | B8 | I-1 | 30 | P14 | 1200 | 300 | 1(<1>) | 14 | 32 | 20 | 180* |
| | B9 | I-1 | 30 | P15 | 1200 | 300 | 1(<1>) | 19 | 39 | 50 | 20* |

Note:
1) The mark * on a steel pipe No. indicates that the chemical composition of the steel pipe does not conform to the ranges as specified in the present invention, and a value marked with * falls outside the corresponding range as specified in the present invention.
2) <1> and <2> in the applied pressure column indicate the methods of applying pressure, wherein <1> indicates the utilization of a stress accompanying thermal expansion and <2> indicates the application of a hydraulic pressure.

| Material No. | Chemical composition (wt%) | | | | | Melting point (°C) | Thickness (μm) |
|---|---|---|---|---|---|---|---|
| | Si | B | Ni | Cr | Mo | | |
| I-1 | 7.5 | 1.5 | 72 | 19 | - | 1140 | 30, 120 |
| I-2 | 7 | 2 | 68 | 20 | 3 | 1130 | 30 |

Fig. 3

| Steel No. | Chemical composition (wt%) | | | | | | | | | | |
|---|---|---|---|---|---|---|---|---|---|---|---|
| | C | Si | Mn | P | S | Cu | Ni | Cr | Mo | W | N |
| S1 | 0.018 | 0.51 | 1.05 | 0.020 | 0.002 | 0.08 | 5.80 | 22.30 | 2.98 | - | 0.15 |
| S2 | 0.020 | 0.39 | 1.15 | 0.018 | 0.001 | 0.45 | 6.90 | 25.20 | 3.05 | 0.29 | 0.13 |
| S3 | 0.015 | 0.42 | 0.54 | 0.015 | 0.002 | 0.51 | 6.90 | 25.05 | 3.12 | 1.98 | 0.28 |

Fig. 4

| Category | Test No. | Proof stress after cold-working | | Proof stress X (kgf/mm²) 1) | (1.3X-10) 2) (kgf/mm²) |
|---|---|---|---|---|---|
| | | pipe No. (steel No.) | Proof stress (kgf/mm²) | | |
| Example of the present invention | A1 | P1(S1) | 59 | 50 | 55 |
| | A2 | P2(S2) | 66 | 55 | 62 |
| | A3 | P3(S3) | 73 | 60 | 68 |
| | A4 | P4(S3) | 72 | 60 | 68 |
| | A5 | P5(S3) | 70 | 60 | 68 |
| | A6 | P6(S3) | 76 | 60 | 68 |
| Example of the comparison | B1 | *P7(S1) | 50*(<55) | 50 | 55 |
| | B2 | *P8(S2) | 58*(<62) | 55 | 62 |
| | B3 | P9(S3) | 74 | 60 | 68 |
| | B4 | P10(S3) | 74 | 60 | 68 |
| | B5 | P11(S3) | 73 | 60 | 68 |
| | B6 | *P12(S3) | 64*(<68) | 60 | 68 |
| | B7 | P13(S3) | 76 | 60 | 68 |
| | B8 | P14(S3) | 72 | 60 | 68 |
| | B9 | P15(S3) | 75 | 60 | 68 |

Note:
1) X indicates the minimal necessary proof stress of a bonded portion.
2) (1.3X-10) indicates the lower limit of a proof stress which must be previously imparted to the bonding portion of material to be bonded.
3) The mark * on a steel pipe No. indicates that the chemical composition of the steel pipe does not conform to ranges as specified in the present invention, and a proof stress value marked with * falls outside the corresponding range as specified in the present invention.

Fig.5

| Category | Test No. | Insert material No. | Insert material Thickness (μm) | Steel pipe No. | Heating temperature (°C) | Holding time (sec.) | Applied pressure (kgf/mm²) | Zone heated to 800°C or higher (mm) | Zone heated to 600°C or higher (mm) | Ar volume or content of atmosphere (%) | Cooling rate (°C/s) |
|---|---|---|---|---|---|---|---|---|---|---|---|
| Example of the present invention | A1 | I-1 | 30 | P1 | 1200 | 300 | 1(<1>) | 17 | 34 | 0 | 120 |
| | A2 | I-1 | 30 | P2 | 1200 | 300 | 1(<1>) | 17 | 35 | 0 | 120 |
| | A3 | I-1 | 30 | P3 | 1200 | 300 | 1(<1>) | 16 | 35 | 0 | 120 |
| | A4 | I-1 | 30 | P4 | 1200 | 300 | 1(<2>) | 15 | 31 | 20 | 150 |
| | A5 | I-2 | 30 | P5 | 1200 | 300 | 1(<2>) | 18 | 36 | 50 | 100 |
| | A6 | I-2 | 30 | P6 | 1200 | 300 | 1(<1>) | 19 | 38 | 80 | 50 |
| Example of the Comparison | B1 | I-1 | 30 | *P7 | 1200 | 300 | 1(<1>) | 18 | 35 | 0 | 120 |
| | B2 | I-1 | 30 | *P8 | 1200 | 300 | 1(<1>) | 16 | 35 | 0 | 120 |
| | B3 | I-1 | 120* | P9 | 1200 | 300 | 1(<1>) | 18 | 38 | 20 | 75 |
| | B4 | I-1 | 30 | P10 | 1200 | 300 | 1(<1>) | 28* | 56* | 50 | 100 |
| | B5 | I-1 | 30 | P11 | 1200 | 300 | 1(<1>) | 16 | 48* | 0 | 150 |
| | B6 | I-1 | 30 | *P12 | 1200 | 300 | 1(<1>) | 17 | 36 | 0 | 120 |
| | B7 | I-1 | 30 | P13 | 1200 | 300 | 1(<1>) | 17 | 35 | 90* | 120 |
| | B8 | I-1 | 30 | P14 | 1200 | 300 | 1(<1>) | 14 | 32 | 20 | 180* |
| | B9 | I-1 | 30 | P15 | 1200 | 300 | 1(<1>) | 19 | 39 | 50 | 20* |

Note:
1) The mark * on a steel pipe No. indicates that the chemical composition of the steel pipe does not conform to the ranges as specified in the present invention, and a value marked with * falls outside the corresponding range as specified in the present invention.
2) <1> and <2> in the applied pressure column indicate the methods of applying pressure, wherein <1> indicates the utilization of a stress accompanying thermal expansion and <2> indicates the application of a hydraulic pressure.

Fig. 6

[Unit: mm]

Fig. 7

[Unit: mm]

| Category | Test No. | Ferritic phase volume percentage (%) | Proof stress (kgf/mm$^2$) | Corrosion cracking |
|---|---|---|---|---|
| Example of the present invention | A1 | 52 | 57 | No |
| | A2 | 54 | 64 | No |
| | A3 | 58 | 70 | No |
| | A4 | 66 | 69 | No |
| | A5 | 58 | 65 | No |
| | A6 | 61 | 72 | No |
| Example of the comparison | B1 | 58 | 46* | No |
| | B2 | 55 | 53* | No |
| | B3 | 44 | 72 | Yes |
| | B4 | 51 | 58* | Yes |
| | B5 | 52 | 70 | Yes |
| | B6 | 60 | 58* | Yes |
| | B7 | 85* | 73 | Yes |
| | B8 | 91* | 70 | Yes |
| | B9 | 45 | 71 | Yes |

Note:
1) A proof stress value marked with * shows not to reach a target value.
2) A ferritic phase volume percentage marked with * falls outside the corresponding range as specified in the present invention.

METHOD FOR BONDING DUAL-PHASE STAINLESS STEEL

The application is a continuation of international application PCT/97/04220 filed on Nov. 19, 1997.

This application claims priority under 35 U.S.C. § § 119 and/or 365 to 8-307577 filed in Japan on Nov. 19, 1996, the entire content of which is herein incorporated by reference.

TECHNICAL FIELD

The present invention relates to a method for bonding dual-phase stainless steel material, particularly dual-phase stainless steel pipes, for use in drilling oil wells, oil purification, oil transportation, and like applications to obtain joints having excellent strength and corrosion resistance.

BACKGROUND ART

Both high strength (proof stress) and high corrosion resistance are required of steel materials, particularly steel pipes, for use in drilling oil wells, oil production, oil purification, oil transportation, and like applications; thus, various materials have been developed in accordance with working environment and applications. Particularly, for application to a wet carbon dioxide environment containing a trace quantity of hydrogen sulfide, dual-phase stainless steel having excellent corrosion resistance is often used. Dual-phase stainless steel has a microstructure of dual phase, i.e. a ferritic phase (hereinafter referred to as ferrite) and an austenitic phase (hereinafter referred as austenite). Since dual-phase stainless steel in the solid-solution heat-treated state is low in proof strength, proof strength is enhanced through cold working.

When dual-phase stainless steel is used as, for example, oil country tubular goods, dual-phase stainless steel pipes having a length of 10 m to 15 m are joined one to another through use of threaded joints as in the case of steel pipes of other materials. Since oil country tubular goods for use in drilling an oil well reach a final overall length of thousands of meters, hundreds of portions joined by means of threaded joints are involved. This method which uses threaded joints involves the following problems.

a) Since accurate threads must be cut, considerable cost is involved.

b) Since a joining force varies among threaded joints, skilled workers must perform the joining work in order to ensure reliability of joined portions.

c) Threads of pipes are susceptible to damage during transport.

To solve these problems, a welding method such as TIG welding is proposed as an alternative to the joining method which uses threaded joints. The welding method is a highly efficient joining method, but involves the following problems.

A) The ferritic phase percentage becomes relatively high over a weld zone and over a wide heat affected zone, causing impairment in toughness and corrosion resistance.

B) Carbon-nitrides, intermetallic compounds, and the like precipitate over a wide heat affected zone, causing impairment in toughness.

As a simple, convenient method to solve these problems involved in the welding method, a diffusion-bonding method is proposed (Japanese Patent Laid-Open (kokai) No. 3-86367). However, even the diffusion-bonding method has a drawback that softening occurs in a zone heated during diffusion-bonding, causing impairment in proof stress of a joint. Hereinafter, a joint refers to a wide zone which includes a bond portion, a heat affected zone, and a portion of base metal adjacent to the heat affected zone.

To solve the above-mentioned drawback, there is disclosed a method in which a zone including an end surface of base metal, which zone will become a joint, is previously cold-worked so as to improve the proof stress of the zone and in which a zone to be heated is narrowed so as to prevent impairment in strength (Japanese Patent Laid-Open (kokai) No. 6-7967). However, since the method described in Japanese Patent Laid-Open (kokai) No. 6-7967 is primarily concerned with a high-alloy steel pipe having an austenitic microstructure, an approach in relation to control of dual-phase microstructure composed of ferrite and austenite is not addressed. Accordingly, when the method of Japanese Patent Laid-Open (kokai) No. 6-7967 is applied to dual-phase stainless steel, the following problems arise.

1) Since the ferritic phase percentage of a bond portion becomes high as compared to that of base metal, the bond portion is impaired in corrosion resistance and toughness.

2) Since carbon-nitrides and intermetallic compounds are formed from ferrite in a bond portion, the bond portion is impaired in toughness and corrosion resistance.

So far, there has not been developed a method for bonding dual-phase stainless steel capable of simply and conveniently obtaining a joint having excellent strength and corrosion resistance.

An object of the present invention is to provide a simple, convenient method for bonding dual-phase stainless steel, particularly dual-phase stainless steel pipes, capable of providing a joint having excellent strength and corrosion resistance.

DISCLOSURE OF THE INVENTION

Inventors of the present invention solved the above problems based on following their acknowledgment.

(a) Through the prevention of release of nitrogen (N) from a bonded portion and the vicinity thereof, there can be prevented an increase in the ferritic phase percentage thereof. The prevention of release of N can be implemented by adjustment of the atmosphere around the bond portion and the vicinity thereof.

(b) In order to prevent an increase in the ferritic phase percentage in a bond portion and the vicinity thereof, in addition to the above-mentioned prevention of release of N, the upper limit of a rate of cooling from a diffusion-bonding temperature must be controlled to a predetermined value or lower. Also, by limitation of the lower limit of the cooling rate to a predetermined value or higher, the precipitation of intermetallic compounds, which would otherwise significantly impair toughness, is very effectively prevented.

(c) Through the quantitative determination of the length of a heating zone which is not impaired in it's toughness or corrosion resistance during diffusion-bonding, and on the basis of the obtained quantitative data, the zone where carbon-nitrides and intermetallic compounds are generated is strictly limited. This limitation of a heating zone is also effective in obtaining a required proof stress to a joint.

(d) In order to obtain a required proof stress to a joint, a material to be bonded is cold-worked at the vicinity of an end surface to be bonded or over the entire length so as to endow the end portion or the entire material with a proof stress which is at least a predetermined amount higher than the required proof stress of the joint.

In the present invention, a diffusion bonding method in which the above-mentioned conditions were used in combination was actually applied to dual-phase stainless steel materials to form joints, and the formed joints were subjected to a corrosion test and the like to confirm the effect of the method. The present invention was thus accomplished. The gist of the present invention resides in the following method for bonding dual-phase stainless steel material through diffusion-bonding.

(1) A method for bonding dual-phase stainless steel material, comprising the steps of: cold-working in at least a zone including a butting surface of the material to be bonded so as to enhance the proof stress of the cold-worked zone to (1.3×(minimal necessary proof stress of joint)–10) kgf/mm² or higher; arranging the materials to be bonded such that the butting surfaces of the materials butt against each other via an insert material having a melting point not higher than 1150° C. and a thickness of 10–80 µm; applying a pressure of 0.5–2 kgf/mm² in a butting direction while performing shielding, by means of a mixed nitrogen/argon gas which contains argon in an amount of 0–80% by volume; diffusion-bonding the butting surfaces through heating such that the following conditions 1) and 2) are satisfied; and cooling a bonded portion and the vicinity thereof such that the following condition 3) is satisfied, so as to adjust the ferritic phase percentage of the bonded portion and the vicinity thereof to 30–70% by volume;

1) Butting portions and the vicinities thereof are heated to a temperature not lower than the melting point of the insert material and lower than the melting point of the dual-phase stainless steel and are held at the temperature for 120 seconds or longer, 2) During heating as described above in 1), heating the zone not longer than 20 mm from the butting surface to a temperature not lower than 800° C., and heating the zone not longer than 40 mm from the butting surface to a temperature not lower than 600° C., 3) After the heating and diffusion-bonding are performed, under the above conditions 1) and 2), cooling the bonded portion to a temperature of 400° C., at a cooling rate of 50–150° C./s.

(2) A method for bonding dual-phase stainless steel material, as described above in (1), wherein the dual-phase stainless steel contains N in an amount of 0.1–0.3% by weight.

(3) A method for bonding dual-phase stainless steel material, as described above in (2), wherein the dual-phase stainless steel material is a pipe.

(4) A method for bonding dual-phase stainless steel material, as described above in (2), wherein the dual-phase stainless steel material is a coiled tubing.

(5) A method for bonding dual-phase stainless steel material, as described above in (1), wherein a mixed nitrogen/argon gas, which contains argon in an amount of 20–80% by volume, is used as shield gas.

(6) A method for bonding dual-phase stainless steel material, as described above in (1), wherein after heating and diffusion-bonding are performed, cooling of the bonded portion to a temperature of 400° C., at a cooling rate of 80–120° C./s.

(7) A method for bonding dual-phase stainless steel material, as described above in (1), wherein the microstructure of the bonded portion and the vicinity thereof has a ferritic phase percentage of 40–70%, by volume.

(8) A method for bonding dual-phase stainless steel material, as described above in (1), wherein a heated zone, corresponding to either of the heated portions is substantially symmetric with respect to the bonded interface.

(9) A method for bonding dual-phase stainless steel material, as described above in (1), wherein the butting portions and the vicinities thereof are heated to a temperature not lower than the melting point of the insert material and lower than the melting point of the dual-phase stainless steel and are held at the temperature for 200–400 seconds.

(10) A method for bonding dual-phase stainless steel material, as described above in (1), wherein the proof stress of at least the cold-worked zone, including the butting surface ranges between (1.3×(minimal necessary proof stress of joint)–8) and (1.5×(minimal necessary proof stress of joint)–5) kgf/mm².

(11) A method for bonding dual-phase stainless steel material, as described above in (1), wherein the dual-phase stainless steel material contains N in an amount of 0.1–0.3% by weight, shielding is performed by means of a mixed nitrogen/argon gas which contains argon in an amount of 20–80% by volume, cooling to a temperature of 400° C. is performed at a cooling rate of 80–120° C./s after the heating and diffusion-bonding are performed, and the bonded portion and the vicinity thereof has a ferritic phase percentage of 40–70% by volume.

(12) A method for bonding dual-phase stainless steel material, as described above in (1), wherein the vicinity of the butting surface is hot-worked so as to increase the thickness thereof, and then the entire material to be bonded is cold-worked so as to obtain a uniform thickness to thereby enhance the proof stress of the vicinity of the butting surface over that of the remainder of the material to be bonded.

(13) A method for bonding dual-phase stainless steel material, as descrided above in (1), wherin the material to be bonded is cold-worked entirely so as to enhance the proof stress of the material.

(14) A method for bonding dual-phase stainless steel material, as described above in (13), wherein the dual-phase stainless steel material contains N in an amount of 0.1–0.3% by weight.

(15) A method for bonding dual-phase stainless steel material, as described above in (14), wherein the dualphase stainless steel material is a pipe.

(16) A method for bonding dual-phase stainless steel material, as described above in (14), wherein the dualphase stainless steel material is a coiled tubing.

(17) A method for bonding dual-phase stainless steel material, as described above in (13), wherein the proof stress of the material is enhanced through cold drawing.

(18) A method for bonding dual-phase stainless steel material, as described above in (13), wherein the proof stress of the material is enhanced through use of a pilger mill.

(19) A method for bonding dual-phase stainless steel material, as described above in (1), wherein the ferritic phase percentage of the material ranges between 30% by volume and 70% by volume.

(20) A method for bonding dual-phase stainless steel material, as described above in (13), wherein the ferritic phase percentage of the material ranges between 30% by volume and 70% by volume.

In the above description, "dual-phase stainless steel" refers to stainless steel whose major microstructure is comprised of a austenitic phase and a ferritic phase at room temperature.

A "zone including a butting surface" refers to the portion of a material to be bonded, which ranges between the butting surface, whose location is taken as 0, and a location about 50 mm from the butting surface.

A "minimal necessary proof stress of a joint" refers to a stress of the material as measured in a tensile test of a bonded joint.

A "bonding portion" refers to, before and during bonding, an insert material and the narrow portions, including butting surfaces of both materials to be bonded, and "bonded portion" refers to, after bonding, the portion of bonded material where the elements of the insert material are densely present and the vicinities of the butting surfaces where the elements of the insert material are recognizably diffused. A "bonded portion and the vicinity thereof" refers to a bonded portion and a heat affected zone adjacent to the bonded portion. Accordingly, the "bonded portion and the vicinity thereof" and a heat unaffected portion of a material constitutes the entirety of a bonded article. In a bonding portion, the interface between the butting surfaces of bonded materials, which is formed after an excessive amount of a liquid-phase insert material is pushed out as a result of application of pressure, is hereinafter referred to as a "bonded interface." Herein, "material" and "material to be bonded" are not discriminated from each other, but refer to dual-phase stainless steel material to be bonded.

BRIEF DESCRIPTION OF THE DRAWINGS

FIG. 5 is a table showing conditions under which diffusion bondings were formed in a test conducted in the example;

BEST MODE FOR CARRYING OUT THE INVENTION

1. Dual-Phase Stainless Steel

Dual-phase stainless steel may be stainless steel having two phases of a austenitic phase and a ferritic phase and corresponds to the following stainless steel in terms of chemical composition. In the following description, "%" accompanying an alloying element refers to "wt. %."

Dual-phase stainless steel may be stainless steel which contains C (not greater than 0.08%), Si (not greater than 2%), Mn (not greater than 2%), Ni (3–8%), Cr (18–28%), and N (0.002–0.35%). In order to stably attain a required austenitic phase percentage so as to obtain good corrosion resistance and toughness, the nitrogen content more preferably ranges between 0.1% and 0.3%. The ferritic phase percentage of dual-phase stainless steel is preferably 30–70% by volume; that is, the volume ratio between ferritic phase and austenitic phase preferably ranges substantially between 3:7 and 7:3 and is more preferably near 1:1.

Dual-phase stainless steel material may be of any shape, but the present invention is concerned particularly with the form of pipe. Pipe may be an ordinary seamless steel pipe or an ordinary straight steel pipe having a longitudinal seam, a spiral weld seam, or a like seam; or a coiled seamless steel pipe, i.e. coiled tubing. The method of the present invention is particularly suited for the bonding of coiled tubing.

2. Heating and Cooling Conditions 2-1) Heating temperature for bond portion and holding time for holding the bonding portion at the temperature A bonding portion is heated to a temperature not lower than the melting point of an insert material and not higher than the melting point of a material to be bonded and is held at the temperature for 120 seconds or longer.

In order to complete bonding in a short period of time, the bonding portion must be heated to a temperature not lower than the melting point of the insert material so as to bring the insert material into the liquid phase, to thereby bring the liquid-phase insert material in contact with the entire butting surfaces of materials to be bonded, i.e. dual-phase stainless steel, and to diffuse the elements of the liquid-phase insert material into the dual-phase stainless steel. When the heating temperature is lower than the melting point of the insert material, the insert material is in the solid phase; thus, the above-mentioned good contact or diffusion cannot be expected.

By contrast, when the insert material is heated to a temperature in excess of the melting point of the dual-phase stainless steel, the material melts, causing the coarsening of a microstructure of the dual-phase stainless steel. As a result, the features of the present invention fail to be yielded.

In order to establish a chemical composition similar to that of the dual-phase stainless steel at a bonded interface, which serves as the center of the bond portion, through sufficient diffusion of elements of the liquid-phase insert material at the bonded interface so as to reliably impart sufficient strength and corrosion resistance to a bonded joint, the bonding portion must be held at a temperature of the above-mentioned temperature zone for 120 seconds or longer. The upper limit of the holding time is not particularly specified. However, heating for a long time is disadvantageous in terms of coarsening of microstructure and economical efficiency. Thus, the holding time is preferably about 1800 seconds or shorter. In order to establish better balance between economical efficiency and the properties of a bonded joint, such as strength and corrosion resistance, the bonding portion is preferably held at a temperature of the above-mentioned temperature zone for 200–400 seconds.

2-2) Restriction on heating zone

A zone including both butting surfaces of a bonding portion which is heated to a temperature not lower than 800° C. during bonding is restricted in length to 20 mm or shorter, and a zone including both butting surfaces of a bonding portion which is heated to a temperature not lower than 600° C. is restricted in length to 40 mm or shorter.

Proof stress which has been enhanced through cold working, which will be described later, is impaired as a result of heating to a temperature of 800° C. or higher. Thus, by restricting to 20 mm or shorter the length of a zone, including both butting surfaces, to be heated to a temperature not lower than 800° C., impairment in the proof stress of a bonded joint can be suppressed within a relatively small range. As mentioned above, even when a proof stress decreased zone is partially present in a bonded joint, if the zone is narrow, a surrounding high-strength zone restrains the proof stress decreased zone from plastically deforming upon subjection to a tensile load.

When a bonding portion is heated, carbon-nitrides and intermetallic compounds are noticeably generated at a heating temperature of 600–1000° C. Thus, the length of a zone, including both butting surfaces, to be heated to a temperature not lower than 600° C. must be limited to 40 mm or shorter. When the length of the zone to be heated to a temperature not lower than 600° C. is in excess of 40 mm, impairment in toughness and corrosion resistance is unavoidable due to generation of precipitates such as carbon-nitrides.

It is prefer that a heating zone is restricted not only by the length of a heating zone to 20 mm or shorter or to 40 mm or shorter but also by equal distribution of the length of 20 mm or 40 mm between both materials to be bonded so that the length is restricted to 10 mm or shorter or to 20 mm or shorter on each of the materials to be bonded. In other words, restriction on a heating zone is effected symmetrically with respect to a bonded interface, i.e. the restriction is preferably effected on both materials to be bonded over the same width on both sides with respect to the bonded interface.

The above-mentioned restriction on a heating zone can be performed by the following method.

1) The width of a device for heating a bonding portion is adjusted.

2) Jackets (see FIG. 1) manufactured of a material having a high thermal conductivity, for example, copper, and used for cooling materials such as steel pipes are attached onto the materials on both sides of the device for heating the bonding portion, thereby suppressing temperature increase, which would otherwise occur due to thermal conduction, at the portions of the materials located outside the heating device. The cooling capability of the cooling jackets is adjusted by changing the flow rate of cooling water and the location of the cooling jackets attached onto the materials to be bonded.

For a zone heated to a temperature not lower than 800° C. and a zone heated to a temperature not lower than 600° C., during bonding temperature can be measured through use of a sensor such as a thermocouple. After bonding, heating temperature can be highly accurately estimated by observation of the microstructure of a bonded portion through an optical microscope and observation of the amount of precipitated carbon-nitrides and intermetallic compounds through an electron microscope, while comparison is made with standard samples, which are prepared through the application of various heat cycles to samples of the same kind.

2-3) Cooling rate of bonded portion

A bonded portion is cooled from a bonding temperature down to 400° C. at a rate of 50–150° C./s. Carbon-nitrides and intermetallic compounds are remarkably generated at a heating temperature of 600–1000° C., causing impairment in properties of a bonded portion. Thus, cooling from a bonding temperature to 400° C. must be performed at a rate not lower than 50° C./s. By contrast, when cooling is performed at an excessively high rate, the generation of austenitic phase in a bond portion is retarded and, in turn, the ferritic phase percentage increases, resulting in a failure to bring the ferritic phase volume percentage into a required range, which will be described later. Accordingly, the upper limit of a cooling rate in the above-mentioned temperature zone is determined to be 150° C./s. In order to further reliably suppress the generation of carbon-nitrides and intermetallic compounds and obtain an appropriate ferritic phase percentage in a bonded portion, the cooling rate is preferably 80–120° C./s.

As in the above-mentioned case of restriction on a heating zone, the cooling rate is controlled by adjustment of the flow rate of cooling water within cooling jackets and adjustment of the location of the cooling jackets attached onto the materials to be bonded.

3. Atmosphere

Bonding is performed in a mixed nitrogen/argon gas atmosphere which contains argon in an amount of 0–80% by volume. In order to provide sufficient strength and corrosion resistance, dual-phase stainless steel contains N in a very high content near a steel-making limit. During bonding, in the vicinities of butting surfaces of materials to be bonded, nitrogen in excess of solution by solid solution diffuses into a liquid-phase insert material to thereby be released into the atmosphere. Accordingly, the ferritic phase percentage increases, causing impairment in the proof stress and corrosion resistance of a bonded joint. Also, nitrogen in process of release becomes a cause of a defect of a bonded zone. These phenomena begin to explicitly occur when the argon gas content and the nitrogen gas content become greater than 80% by volume and less than 20% by volume, respectively.

Even when the argon gas content is zero, i.e. the nitrogen gas content is 100% by volume, there merely occurs a slight increase in the amount of nitride precipitates in a bond portion. Accordingly, bonding is performed in an atmospheric gas whose argon gas content ranges between 0 and 80% by volume. When the argon gas content is 0, i.e. the nitrogen gas content is 100% by volume, the amount of nitride precipitates increases in a bonded portion as mentioned above, causing a potential impairment in ductility as measured in a tensile test of a boded joint. Thus, the argon gas content is more preferably 20–80% by volume.

4. Microstructure of a Bonded Portion

A bonded portion and the vicinity thereof is adjusted to have a ferritic phase volume percentage of 30–70% through the appropriate combination of the above-mentioned conditions. When the ferritic phase volume percentage is less than 30%, sufficient toughens and corrosion resistance cannot be obtained. By contrast, when the volume ratio is in excess of 70%, toughness and corrosion resistance are impaired. More preferably, the ferritic phase percentage ranges between 40–70% by volume. It is preferable that the entirety of a bonded member, which is composed of a bond portion and the vicinity thereof and a heat unaffected portion of a member, have a ferritic phase percentage ranging between 30 and 70% by volume. The ferritic phase volume percentage can easily be brought within the range through use of the above-mentioned manufacturing method.

5. Insert Material

An insert material must have a melting point not higher than 1150° C. and a thickness of 10–80 μm. An insert material for use in bonding dual-phase stainless steel is preferably a metallic material.

When the melting point of an insert material is in excess of 1150° C., the insert material fails to have sufficient fluidity when it assumes the liquid phase at a bonding temperature, for example, 1200° C., which is comprehensively determined in consideration of diffusion rate and the like at a temperature higher than the melting point of the insert material. As a result, the contact between the insert material and the entire butting surfaces of materials to be bonded becomes insufficient, resulting in a failure to obtain a good bonded portion.

In order for a metallic insert material to have a melting point not higher than 1150° C., the metallic insert material is preferably a thin strip which is formed through the rapid solidification of molten metal, for example, having the following chemical composition: Cr: not less than 5%; Mo: not more than 9%; Si: 6.5–10%; B: not more than 4%; balance: Ni. When the melting point is not higher than 1150° C., the boron and silicon contents may be varied so long as the sum of them does not exceed 12%.

A lower melting point of an insert material is more preferred. However, an insert material having a melting point lower than 1050° C. is rarely present. Even when such an insert material is available and brought in the liquid phase at a relatively low heating temperature so as to utilize the feature of a low melting point, the rate of diffusion into materials to be bonded decreases, resulting in insufficient bonding. Accordingly, the lower limit of the melting point of an insert material is preferably about 1050° C.

When the thickness of an insert material is less than 10 μm, a roughness of the butting surface cannot be completely filled with insert material. This causes the occurrence of defect with a resultant impairment in bonding strength. By contrast, when the thickness is in excess of 80 μm, the diffusion of Si and B requires heating for a relatively long time, causing impairment in bonding efficiency. If bonding is completed in a relatively short time, Si and B segregate in a bonded interface portion and corrosion resistance is deteriorated. Accordingly, the thickness of an insert material is determined to be 10–80 μm.

Such a thickness can be obtained easily by, for example, the rapid solidification method of molten metal. Specifically, a molten metal having the above-mentioned chemical composition is dropped onto twin rolls or single roll rotating at a high speed. Instead of self-manufacture of an insert material, many kinds of amorphous thin strips usable as an insert material are procurable on the market.

6. Improvement of Proof Stress Through Cold Working

In the present invention, cold working must be performed on at least the vicinities of the butting surfaces of dual-phase stainless steel, which serves as materials to be bonded, so as to improve the proof stress of the cold-worked zone to (1.3×(minimal necessary proof stress of joint)−10) kgf/mm² or higher. Alternatively, the entire materials to be bonded may be previously cold-worked. In some case, cold-working the entire material may be easier to perform in view of a manufacturing process. When the entire material is to be cold-worked, a target proof stress of the base metal must be similar to that of the case of cold-working the vicinity of a butting surface.

When the proof stress of the vicinity of a butting surface or the proof stress of the entire base metal is less than (1.3×(minimal necessary proof stress of joint)−10) kgf/mm² before bonding is performed, the proof stress of a bonded joint becomes lower than the minimal necessary proof stress of material.

By contrast, excessively intensive cold working causes an impairment in corrosion resistance. Thus, preferably, the proof stress of butting portions and the vicinities thereof is enhanced through cold working to (1.5×(minimal necessary proof stress of joint)−5) kgf/mm² or less. In order to reliably impart sufficient strength and corrosion resistance to a bonded joint, the enhanced proof stress preferably ranges between (1.3×(minimal necessary proof stress of joint)−8) and (1.5×(minimal necessary proof stress of joint)−5) kgf/mm².

In the case of pipes and coiled tubing, cold working can be carried out through cold drawing, rolling by a pilger mill, or local cold forging while a mandrel is inserted. In the case of shapes other than pipes, cold working can be carried out through cold rolling, forging, hammering, or the like. When only the vicinity of an end surface of a pipe or coiled tubing is to be cold-worked, the vicinity of an end surface may be hot-upset so as to increase its thickness and then be subjected to cold working so as to make the once increased thickness decreased to the same thickness as that of the remainder of the pipe or coiled tubing, to thereby enhance the proof stress of the cold-worked zone. By any of these methods, cold-working must be performed at least in the zone which ranges between a butting surface, whose location is taken as 0 mm, and a location about 0–50 mm away from the butting surface. Of course, as mentioned above, the entire material to be bonded may be cold-worked. The reason why a portion which extends at least 50 mm from an end must be cold-worked is to restrain a softened portion of a heat affected zone including a bond portion by a surrounding high-proof-stress portion adjacent to the softened portion to thereby reliably impart a required minimum proof stress to base metal. For example, 5% cold working easily imparts a proof stress of about 760 MPa (110 ksi) to dual-phase stainless steel, irrespective of whether the vicinity of an end surface or the entire base metal is cold-worked. The proof stress of this portion may be directly obtained by a tensile test or, for example, through conversion of hardness obtained by a hardness test to a proof stress.

7. Applied Pressure

A pressure applied during bonding is 0.5–2 kgf/mm² as measured on a surface perpendicular to a butting direction. When the applied pressure is less than 0.5 kgf/mm², reliable adhesion during bonding is not established between a liquid-phase insert material and the butting surfaces of materials to be bonded and also between the materials to be bonded each other.

When the applied pressure is in excess of 2 kgf/mm², the deformation of a bonding portion becomes excessively large. Thus, the upper limit of the applied pressure is determined to be 2 kgf/mm².

The above-mentioned pressure may be applied in the form of a reaction force which is generated in a spring attached to the clamps of materials to be bonded as a result of the thermal expansion of the materials, or may be externally applied in the form of a hydraulic pressure.

EXAMPLES

The effects of the present invention will next be described by way of example. In examples of the present invention, a dual-phase stainless steel pipe was used as materials to be bonded.

Figure 2:
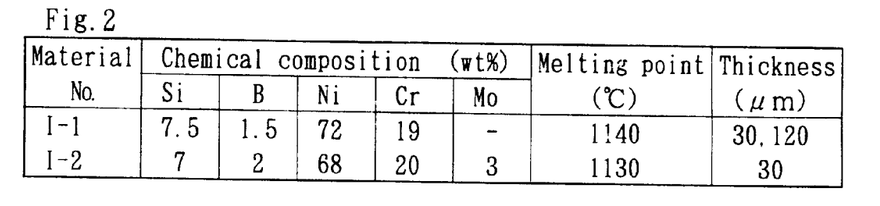
FIG. 2 is a table showing the chemical composition and other properties of insert materials used in a test conducted in the example.

FIG. 2 shows the chemical composition and other properties of insert materials used in an experiment. Insert material I-1 had a melting point of 1140° C., and insert material I-2 had a melting point of 1130° C. The insert materials I-1 had thickness of 30 μm and 120 μm, and insert material I-2 had a thickness of 30 μm.

Figure 3:
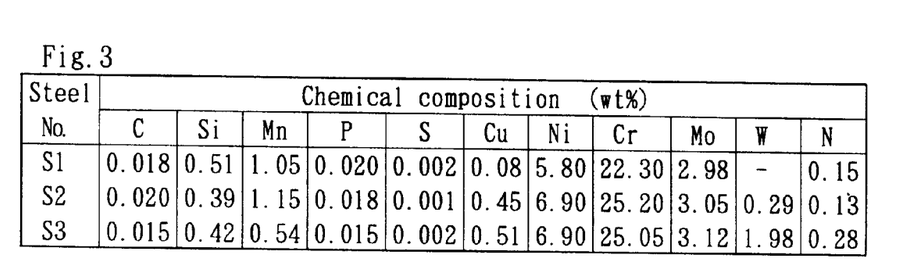
FIG. 3 is a table showing the chemical composition of three kinds of dual-phase stainless steel pipes used as materials to be bonded in a test conducted in the example.

FIG. 3 shows the chemical composition of three kinds of dual-phase stainless steel pipes serving as materials to be bonded. These test materials all have a melting point not lower than 1550° C. The test materials are seamless steel pipes having an outer diameter of 130 mm and a wall thickness of 15 mm and manufactured by the steps of:

piercing in an ordinary manner; rolling by a mandrel mill; finish rolling by a stretch reducer; performing solid solution heat treatment at a temperature of 1150° C.; and cold drawing, during which the cold working ratio was varied so as to vary the proof stress.

Figure 4:
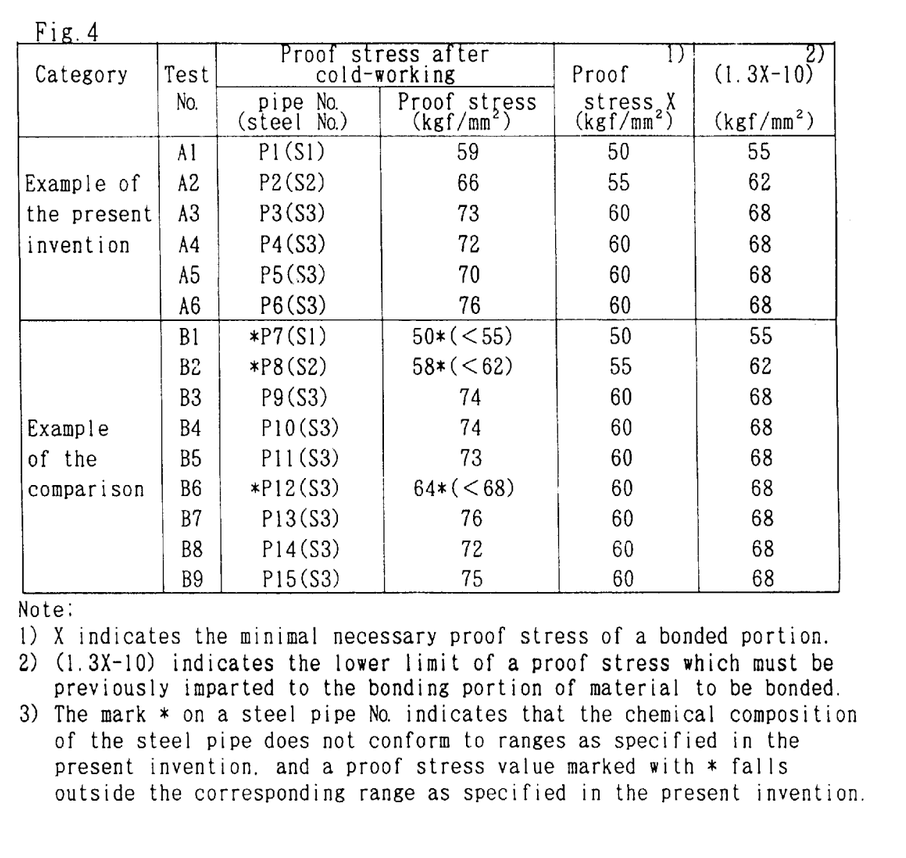
FIG. 4 is a table showing an actual proof stress of the steel pipes used in a test conducted in the example; a minimal necessary proof stress (kgf/mm$^2$) of a joint, and a lower limit of the proof stress (1.3×(minimal necessary proof stress of joint)−10) (kgf/mm$^2$) which must be previously added to a material to be bonded in the present invention.

FIG. 4 shows actual proof stresses of these steel pipes, the minimal necessary proof stress of a joint (kgf/mm$^2$), and the lower limit of a proof stress which must be previously added to a material in the present invention (1.3×(minimal necessary proof stress of joint)−10)(kgf/mm$^2$).

Figure 1:
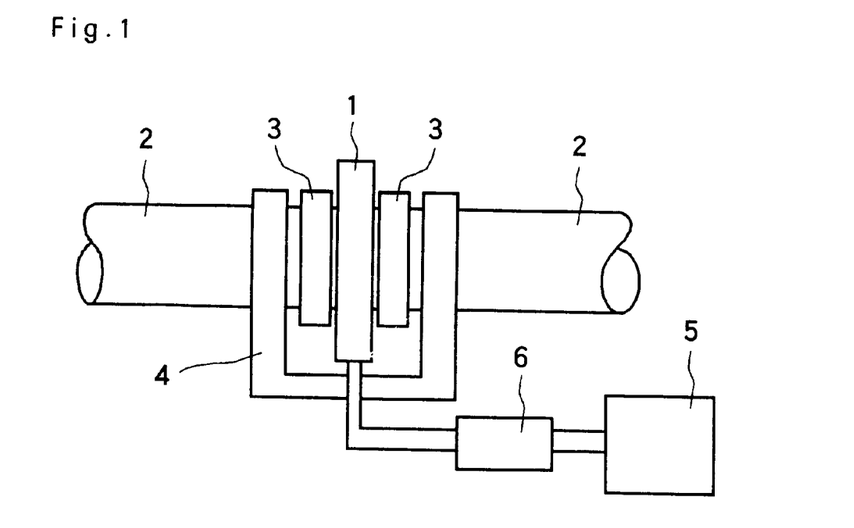
FIG. 1 is a schematic view showing a bonding apparatus used in an example of the method of the present invention for bonding dual-phase stainless steel pipes, wherein reference numeral 1 denotes a copper one-turn coil for heating and gas shielding, numeral 2 denotes dual-phase stainless steel pipes, numeral 3 denotes cooling jackets located on both sides of the coil for heating and gas shielding and used for cooling the steel pipes, numeral 4 denotes a damper of press type, numeral 5 denotes a high frequency electric source, and numeral 6 denotes a controller.

As shown in FIG. 1, a bonding apparatus used in the experiments includes a one-turn coil for heating and gas shielding. The width of zone heated to a temperature not lower than 800° C. and of zone heated to a temperature not lower than 600° C. was varied by varying the width of the heating coil 1 within the range between 10 mm and 50 mm and varying the cooling capability of cooling jackets 3 for cooling a steel pipe 2 (the cooling jackets 3 are directly attached onto the steel pipe 2, and cooling water is circulated within the jackets) located on the outer sides of the steel pipe 2.

In order to apply pressure to a steel pipe to be tested, the steel pipe was clamped and pressure was applied by the following two methods: <1> a spring was incorporated into a damper so as to release a portion of stress accompanying thermal expansion to thereby adjust an applied pressure; and <2> pressure was externally applied in the form of a hydraulic pressure.

Steel pipes were arranged in such a manner as to butt against each other, while an insert material was inserted between the butting surfaces of steel pipes. The butting portions were heated and held at the heating temperature, while pressure was applied, to thereby perform bonding. The ferritic phase content of the bonded portion of the thus-obtained joint was measured through use of a ferrite scope.

FIG. 5 is a table showing conditions under which diffusion-bonding was performed.

Also, the bonded portion were evaluated for strength and corrosion resistance by a tensile test and a corrosion test.

Figure 6:
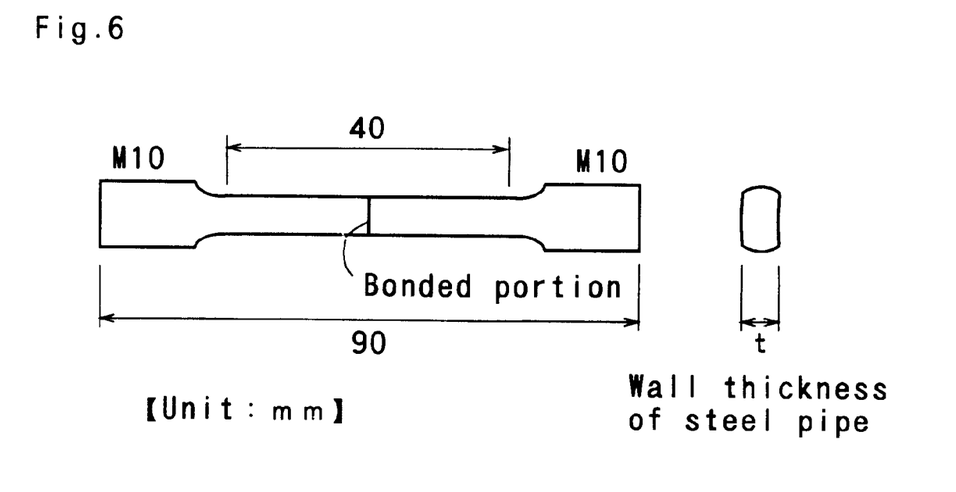
FIG. 6 is a view showing the shape of a test piece used in a tensile test on bonded portion in the example.

FIG. 6 shows the shape of a test piece used in the tensile test on the bonded portion.

Figure 7:
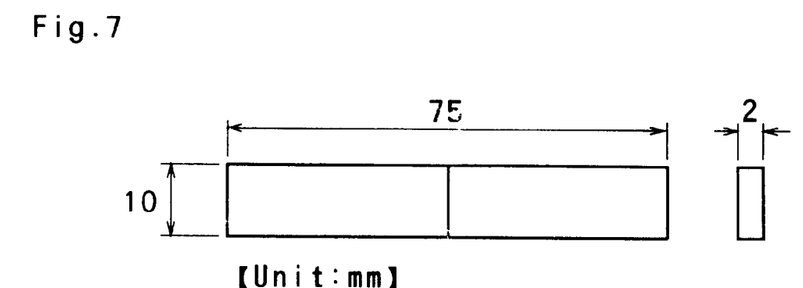
FIG. 7 is a view showing a test piece used in a corrosion test conducted in the example.
Figure 8:
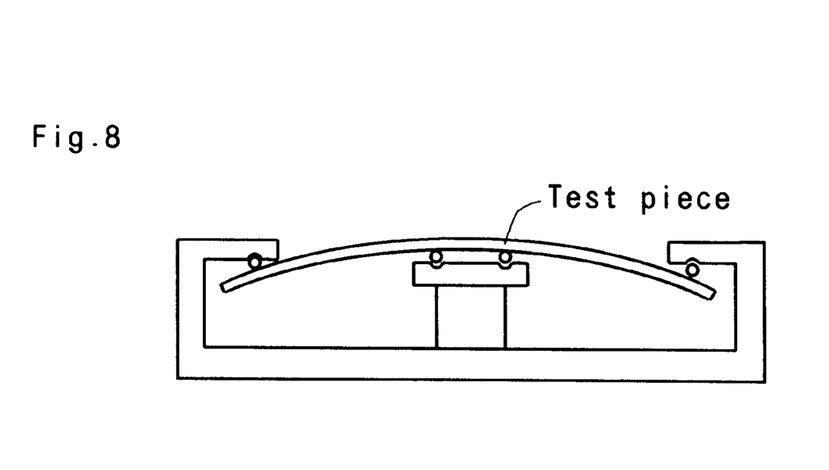
FIG. 8 is a view showing the condition when the test piece was attached onto a test jig.

FIG. 7 shows a test piece used in the corrosion test, and FIG. 8 shows the condition when the test piece was attached onto a test jig.

The corrosion test was conducted in a 5% NaCl solution having a temperature of 80° C. and saturated with H$_2$S having a partial pressure of 0.001 MPa and CO$_2$ having a partial pressure of 3.0 MPa. A test piece was placed in the solution in a bent state as shown in FIG. 8 so as to induce a stress corresponding to the proof stress of material at the center of the test piece. After the elapse of 336 hours, the test piece was checked for corrosion cracking.

Figure 9:
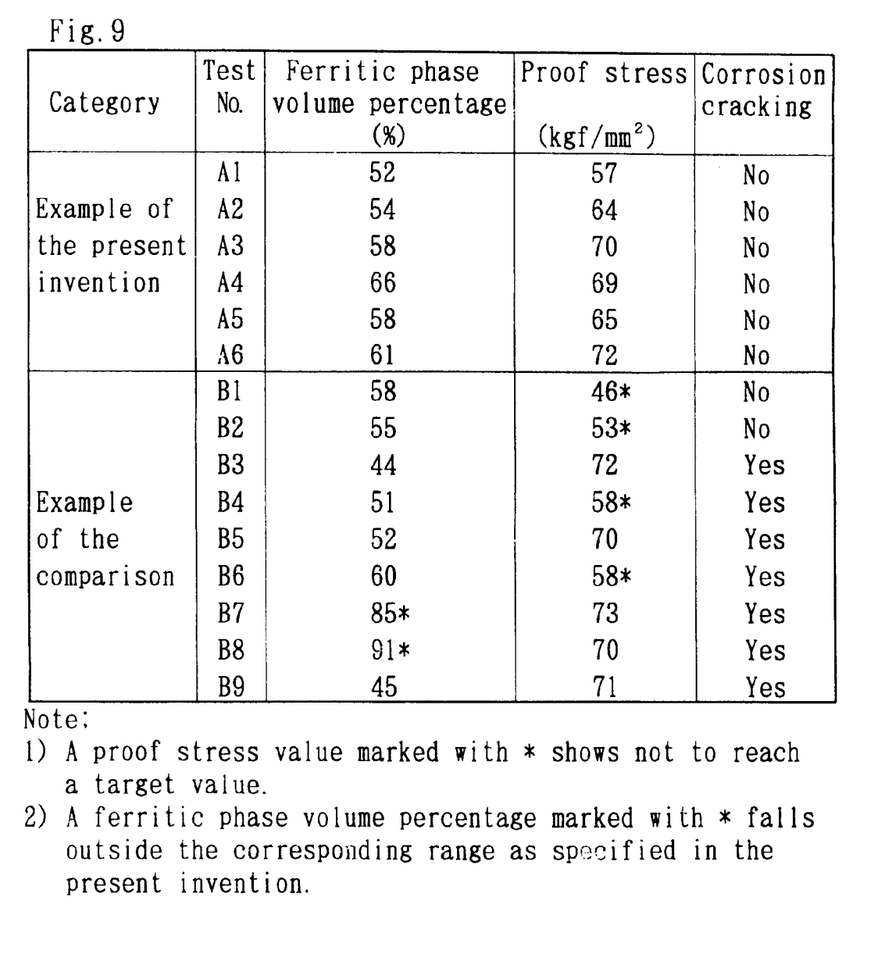
FIG. 9 is a table showing the test results.

FIG. 9 shows the test results.

In comparative examples B1, B2, and B6 in which enhancement through the cold working of material was insufficient and in comparative example B4 in which the zone heated to a temperature not lower than 800° C. was in excess of 20 mm, the proof stress of a bonded portion failed to reach a required value.

In comparative example B3 in which an insert material was excessively thick, corrosion resistance was impaired due to segregation of Si and B in a bonded layer.

In comparative examples B4 and B5, since a zone heated to a temperature not lower than 600° C. was in excess of 40 mm, carbon-nitrides and intermetallic compounds precipitated in relatively large amounts, causing impairment in corrosion resistance. As a result, cracking occurred in the corrosion test.

In comparative example B7, since the argon gas content of a bonding atmosphere was 90% by volume, which fell outside the corresponding range as specified in the present invention, the ferritic phase volume percentage of a bonded portion was in excess of 70%, and corrosion resistance was impaired. As a result, cracking occurred in the corrosion test.

In comparative example B8, since the cooling rate was excessively high, the ferritic phase percentage became relatively high. As a result, cracking occurred in the corrosion test.

In comparative example B9, since the cooling rate was excessively low, carbon-nitrides and intermetallic compounds precipitated in relatively large amounts, causing impairment in corrosion resistance. As a result, cracking occurred in the corrosion test.

By contrast, in examples A1 to A6 which satisfy all conditions specified in the present invention, obtained joints were sufficiently satisfactory in terms of proof stress and corrosion resistance.

INDUSTRIAL APPLICABILITY

The present invention provides a method for bonding dual-phase stainless steel material capable of providing a bonded portion having excellent proof stress and corrosion resistance. Thus, the bonding method is useful as a basic technique related to dual-phase stainless steel material, whose use is increasing in oil-related industries and other relevant industries in order to improve the degree of safety.

What is claimed is:

1. A method for bonding dual-phase stainless steel material, comprising the steps of: cold-working in at least a zone including a butting surface of the material to be bonded so as to enhance the proof stress of the cold-worked zone to (1.3×(minimal necessary proof stress of joint)−10) kgf/mm$^2$ or higher; arranging the materials to be bonded such that the butting surfaces of the materials butt against each other via an insert material having a melting point not higher than 1150° C. and a thickness of 10–80 μm; applying a pressure of 0.5–2 kgf/mm$^2$ in a butting direction while performing shielding, by means of a mixed nitrogen/argon gas which contains argon in an amount of 0–80% by volume; diffusion-bonding the butting surfaces through heating such that the following conditions 1) and 2) are satisfied; and cooling a bonded portion and the vicinity thereof such that the following condition 3) is satisfied, so as to adjust the ferritic phase percentage of the bonded portion and the vicinity thereof to 30–70% by volume;

1) Butting portions and the vicinities thereof are heated to a temperature not lower than the melting point of the insert material and lower than the melting point of the dual-phase stainless steel and are held at the temperature for 120 seconds or longer, 2) During heating as described above in 1), heating the zone not longer than 20 mm from the butting surface to a temperature not lower than 800° C., and heating the zone not longer than 40 mm from the butting surface to a temperature not lower than 600° C., 3) After the heating and diffusion-bonding are performed, under the above conditions 1) and 2), cooling the bonded portion to a temperature of 400° C., at a cooling rate of 50–150° C./s.

2. A method for bonding dual-phase stainless steel material, according to claim 1, wherein the dual-phase stainless steel material contains N in an amount of 0.1–0.3% by weight.

3. A method for bonding dual-phase stainless steel material, according to claim 2, wherein the dual-phase stainless steel material is a pipe.

4. A method for bonding dual-phase stainless steel material, according to claim 2, wherein the dual-phase stainless steel material is a coiled tubing.

5. A method for bonding dual-phase stainless steel material, according to claim 1, wherein a mixed nitrogen/argon gas, which contains argon in an amount of 20–80% by volume, is used as shield gas.

6. A method for bonding dual-phase stainless steel material, according to claim 1, wherein after heating and diffusion-bonding are performed, cooling of the bonded portion to a temperature of 400° C., at a cooling rate of 80–120° C./s.

7. A method for bonding dual-phase stainless steel material, according to claim 1, wherein the microstructure of the bonded portion and the vicinity thereof has a ferritic phase percentage of 40–70% by volume.

8. A method for bonding dual-phase stainless steel material, according to claim 1, wherein a heated zone, corresponding to either of the heated portions is substantially symmetric with respect to the bonded interface.

9. A method for bonding dual-phase stainless steel material, according to claim 1, wherein the butting portions and the vicinities thereof are heated to a temperature not lower than the melting point of the insert material and lower than the melting point of the dual-phase stainless steel and are held at that temperature for 200–400 seconds.

10. A method for bonding dual-phase stainless steel material, according to claim 1, wherein the proof stress of at least the cold-worked zone, including the butting surface ranges between (1.3×(minimal necessary proof stress of joint)−8) and (1.5×(minimal necessary proof stress of joint)−5) kgf/mm².

11. A method for bonding dual-phase stainless steel material, according to claim 1, wherein the dual-phase stainless steel material contains N in an amount of 0.1–0.3% by weight, shielding is performed by means of a mixed nitrogen/argon gas which contains argon in an amount of 20–80% by volume, cooling to a temperature of 400° C. is performed at a cooling rate of 80–120° C./s after the heating and diffusion-bonding are performed, and the bonded portion and the vicinity thereof has a ferritic phase percentage of 40–70% by volume.

12. A method for bonding dual-phase stainless steel material, according to claim 1, wherein the vicinity of the butting surface is hot-worked so as to increase the thickness thereof, and then the entire material to be bonded is cold-worked so as to obtain a uniform thickness to thereby enhance the proof stress of the vicinity of the butting surface over that of the remainder of the material to be bonded.

13. A method for bonding dual-phase stainless steel material, according to claim 1, wherein the material to be bonded is cold-worked entirely so as to enhance the proof stress of the material.

14. A method for bonding dual-phase stainless steel material, according to claim 13, wherein the dual-phase stainless steel material contains N in an amount of 0.1–0.3% by weight.

15. A method for bonding dual-phase stainless steel material, according to claim 14, wherein the dual-phase stainless steel material is a pipe.

16. A method for bonding dual-phase stainless steel material, according to claim 14, wherein the dual-phase stainless steel material is a coiled tubing.

17. A method for bonding dual-phase stainless steel material, according to claim 13, wherein the proof stress of the material is enhanced through cold drawing.

18. A method for bonding dual-phase stainless steel material, according to claim 13, wherein the proof stress of the material is enhanced through use of a pilger mill.

19. A method for bonding dual-phase stainless steel material, according to claim 1, wherein the ferritic phase percentage of the material ranges between 30% by volume and 70% by volume.

20. A method for bonding dual-phase stainless steel material, according to claim 13, wherein the ferritic phase percentage of the material ranges between 30% by volume and 70% by volume.

* * * * *